United States Patent
Nishimoto et al.

(10) Patent No.: US 6,649,664 B2
(45) Date of Patent: Nov. 18, 2003

(54) PROCESS FOR PRODUCING RECLAIMED EXPANDABLE POLYSTYRENE RESIN PARTICLE

(75) Inventors: Kenryo Nishimoto, Kagoshima (JP); Hiroyuki Kariyazono, Kagoshima (JP); Kazuto Hamaishi, Kagoshima (JP)

(73) Assignee: Kagoshimaken, Kagoshima (JP)

( * ) Notice: Subject to any disclaimer, the term of this patent is extended or adjusted under 35 U.S.C. 154(b) by 0 days.

(21) Appl. No.: 10/221,035

(22) PCT Filed: Mar. 14, 2001

(86) PCT No.: PCT/JP01/02016
§ 371 (c)(1),
(2), (4) Date: Sep. 9, 2002

(87) PCT Pub. No.: WO01/68759
PCT Pub. Date: Sep. 20, 2001

(65) Prior Publication Data
US 2003/0036576 A1 Feb. 20, 2003

(30) Foreign Application Priority Data
Mar. 15, 2000 (JP) .......................................... 2000-072913

(51) Int. Cl.⁷ .................................................. C08J 9/00
(52) U.S. Cl. ...................................................... 521/50
(58) Field of Search ............................... 521/47; 11/146

(56) References Cited

U.S. PATENT DOCUMENTS 5,629,352 A * 5/1997 Shiino et al.
5,859,072 A * 1/1999 Emori
5,891,403 A * 4/1999 Badger et al.
6,326,408 B1 * 12/2001 Jura
6,403,661 B1 * 6/2002 Usui et al.

FOREIGN PATENT DOCUMENTS

JP 11080418 3/1999
JP 2000248099 9/2000

* cited by examiner

*Primary Examiner*—Morton Foelak
(74) *Attorney, Agent, or Firm*—Rader, Fishman & Grauer PLLC

(57) ABSTRACT

It is possible to recover a volume reducing agent from a waste foamed polystyrene resin material compacted with the volume reducing agent and to impregnate a blowing agent into the compacted material at ordinary room temperature. The volume reducing agent is preferably a polar solvent having solubility with respect to the polystyrene resin and exhibiting a mutual solubility with the blowing agent, which is one whose hydrogen bond term $\delta h$ and polarity term $\delta p$ of the Hansen solubility parameters satisfy the following conditions:

$$(\delta p - 5.8)^2 + (\delta h - 4.3)^2 < 50 \text{ and } \delta p^2 + \delta h^2 > 46 \quad [\text{units}: (J/cm^3)^{1/2}]$$

The solvent used as the volume reducing agent is preferably at least one solvent selected from the group consisting of ketones, esters, polyhydric alcohol ether acetates, ethers, halogenated hydrocarbons, nitro compounds, and amines. The solvent may be a mixed solvent consisting essentially of at least one solvent selected from the above-described group and at least one solvent selected from the group consisting of aliphatic hydrocarbons and aromatic hydrocarbons.

13 Claims, 2 Drawing Sheets

PROCESS FOR PRODUCING RECLAIMED EXPANDABLE POLYSTYRENE RESIN PARTICLE

TECHNICAL FIELD

The present invention relates to a method of producing regenerated expandable polystyrene resin particles to regenerate and reuse expanded polystyrene resins used as thermal and heat insulation materials, packing materials for packaging, etc. More particularly, the present invention relates to a method of producing regenerated expandable polystyrene resin particles to regenerate foamed polystyrene resin materials discarded as waste after use, or flashes, defective products, etc. produced during the process of forming foamed materials and to reuse them as foamed materials.

BACKGROUND ART

Expanded polystyrene is used in large quantities as packing materials, cushioning materials, thermal insulation materials for buildings and refrigerators, tatami cores, roofing, container packaging materials, decorative materials, foundry materials, and so forth. Waste of these materials or foamed polystyrene resin materials produced as flashes or defective products and discarded as waste should preferably be recycled and reused as much as possible. However, expanded polystyrene is large in specific volume and bulky at sites where waste expanded polystyrene occurs. Therefore, it is desirable in order to recycle these waste expanded polystyrene materials that they should be subjected to volume reduction at sites where waste expanded polystyrene occurs from the viewpoint of ensuring a space for collection and storage and reducing the cost of transporting the waste to a regeneration factory.

Various methods for volume reduction have been proposed, e.g. a method wherein waste expanded polystyrene is crushed and formed into blocks by friction compression or melting under heating, and a method wherein waste expanded polystyrene is dissolved in a solvent to achieve volume reduction. For example, Japanese Patent Application Unexamined Publication (KOKAI) No. Sho 50-109966 discloses a method wherein styrene resin particles having a size not larger than 1 cm and a specific gravity of about 0.2 and containing a large number of cells are dispersed in water containing an organic solvent and stirred for at least 30 minutes at a temperature not lower than the softening point of the resin and then impregnated with hydrocarbon to regenerate expandable styrene resin particles. With this method, it is generally difficult to compact foamed styrene resin articles to a specific gravity of 0.2 stably and industrially.

Japanese Patent Application Unexamined Publication (KOKAI) No. Hei 6-87973 proposes a method wherein styrene resin particles with a size of 0.3 to 5 mm obtained by melting a compacted material of foamed styrene resin articles under heating with an extruder, a heated roll or the like are dispersed in an aqueous medium containing an organic dispersant and impregnated with an easily-volatile hydrocarbon at a temperature not lower than 100° C. and not higher than 140° C. to produce spherical regenerated expandable styrene resin particles. This method requires that impregnation with a volatile hydrocarbon should be carried out in a reaction pressure vessel, e.g. an autoclave, in order to keep pressure and temperature. It is difficult to use such equipment at a site where waste is produced. Moreover, the method suffers low productivity.

Japanese Patent Application Unexamined Publication (KOKAI) Nos. Hei 5-310987 and Hei 11-269299 disclose a method wherein foamed styrene resin articles are heat-shrunk into blocks, which are then crushed to obtain styrene resin particles. The styrene resin particles are dispersed in an aqueous medium containing an organic polymer dispersant and impregnated with an easily-volatile blowing agent to produce regenerated expandable styrene resin particles.

However, this method uses a large amount of organic polymer dispersant. Therefore, wastewater treatment becomes a new problem. Thus, the method involves a problem in terms of cost and lacks practicality. The method requires that impregnation with a blowing agent should be carried out in a reaction pressure vessel, e.g. an autoclave, in order to keep pressure and temperature. In addition, the method suffers low productivity.

In Japanese Patent Application Unexamined Publication (KOKAI) No. Hei 5-98062, a crushed, foamed styrene resin material is melted by heating in an extruder, extruded and cut into styrene resin particles. The styrene resin particles are dispersed in pure water, and a styrene monomer solution of benzoyl peroxide is added to the dispersion, thereby allowing the styrene resin particles to absorb and polymerize with the solution. Thereafter, the styrene resin particles are impregnated with butane as a blowing agent.

Thus, the resin destroyed by melting on heating is ensured a weight-average molecular weight in the range of 200,000 to 400,000. This method similarly uses a large amount of dispersant. Therefore, wastewater treatment becomes a new problem. Thus, the method involves a problem in terms of cost and lacks practicality. Further, the method requires that polymerization should be performed in a reaction pressure vessel, e.g. an autoclave, in order to keep pressure and temperature. Therefore, the method is difficult to use at a site where waste is produced, and suffers low productivity, as in the case of the above-described methods.

Japanese Patent Application Unexamined Publication (KOKAI) No. Hei 9-208734 states that expandable styrene resin particles obtained by suspension polymerization, which are off-specification products having an average particle diameter not larger than 0.4 mm or not smaller than 1.3 mm, are introduced into an extruder, together with a styrene resin and a blowing agent, and the mixture is extruded into a heated liquid under pressure and instantaneously cut to obtain regenerated expandable particles. This method needs to carry out the process in a reaction pressure vessel, e.g. an autoclave, in order to allow the resin extruded from the extruder to maintain a pressure higher than the saturated vapor pressure of the blowing agent and a necessary temperature. Accordingly, the method is difficult to use at a site where waste is produced, and suffers low productivity, as in the case of the above-described methods.

As has been stated above, the regenerated expandable polystyrene resin particle producing methods that have heretofore been proposed are regeneration methods which are roughly as follows. From a compacted material reduced in volume with a volume reducing agent, the volume reducing agent and the polystyrene resin are separated. Alternatively, blocks of polystyrene resin are formed by heat shrinkage. Then, the polystyrene resin is impregnated with a blowing agent to obtain regenerated expandable polystyrene resin particles.

These conventional regenerated expandable polystyrene resin particle producing methods require that the operation for separating the volume reducing agent and the operation for impregnating the resin with the blowing agent should be performed separately from each other, and hence need a large number of man-hours. Further, because a dispersant is used, wastewater treatment is required. Therefore, the conventional methods are disadvantageous from the viewpoint of production cost.

Further, the conventional methods suffer from the problem of energy loss due to heat shrinkage. The method wherein the volume reducing agent is separated from the compacted material by heating or the polystyrene resin melted under heating is extruded by an extruder or the like for heat shrinkage to reduce the volume thereof suffers from the problem of deterioration of the resin due to heat history. The method wherein polymerization is performed again to compensate for the deterioration suffers from the loss of energy and needs a process for polymerization and hence requires an increasingly more complicated process. With the foregoing problems as background, the present invention was made to attain the following objects.

An object of the present invention is to provide a method of producing regenerated expandable polystyrene resin particles that is capable of simultaneously performing the recovery of a volume reducing agent from a waste foamed polystyrene resin material compacted with the volume reducing agent and the impregnation with a blowing agent at ordinary room temperature.

Another object of the present invention is to provide a method of producing regenerated expandable polystyrene resin particles that consumes minimum heat energy.

DISCLOSURE OF INVENTION (First Method of Producing Regenerated Expandable Polystyrene Resin Particles)

A first method of producing regenerated expandable polystyrene resin particles according to the present invention is characterized in that a waste foamed polystyrene resin material made of an expanded polystyrene resin is dissolved in a volume reducing agent having solubility with respect to the foamed polystyrene resin material and exhibiting a mutual solubility with a blowing agent to be used, thereby forming a compacted material, and the compacted material is dipped in the blowing agent for expanding the polystyrene resin at ordinary room temperature, thereby extracting the volume reducing agent from the compacted material and, at the same time, impregnating the compacted material with the blowing agent to regenerate the expanded polystyrene resin, and forming the regenerated expandable polystyrene resin into a predetermined shape.

The term "polystyrene resin" as used in the present invention means a polymer obtained by polymerizing styrene or a copolymer obtained by copolymerization of a material containing a polystyrene as a main component with another monomer. The term "expanded polystyrene resin" as used in the present invention means a resin having small closed cells produced by impregnating the above-described polystyrene resin with a blowing agent and expanding the impregnated polystyrene resin under heating. The term "foamed polystyrene resin material" as used in the present invention means the above-described expanded polystyrene resin shaped by a publicly known forming method, and mainly means foamed materials discarded as waste after use.

Further, foamed polystyrene resin materials in the present invention may be different from each other in the constituent material and the method of forming according to the purpose of use and the shape thereof, such as thermal insulation materials and packing materials, and roughly divided into those molded from expandable polystyrene resin particles (i.e. moldings), and those expanded by extrusion (i.e. boards, styrene paper, etc.). The expandable polystyrene resin is the above-described polystyrene resin containing a blowing agent, which is also used as a material for forming the above-described foamed polystyrene resin material. The above-described expandable polystyrene resin particles are globular or columnar beads of the above-described polystyrene resin containing a blowing agent, which are used as a foaming material. When heated, the beads expand and form closed cells therein.

The volume reducing agent in the present invention is a polar solvent having solubility with respect to the polystyrene resin and exhibiting a mutual solubility with the blowing agent. Generally speaking, the polar solvent used as the volume reducing agent in the present invention is a liquid consisting of molecules with a large dipole moment and having a large specific dielectric constant. The polar solvent used as the volume reducing agent in the present invention should desirably be a polar solvent whose hydrogen bond term δh and polarity term δp satisfy the following conditions when specified by the Hansen solubility parameters (Hansen 3D solubility parameters):

$$(\delta p-5.8)^2+(\delta h-4.3)^2<50 \text{ and } \delta p^2+\delta h^2>46 \qquad [\text{units}:(J/cm^3)^{1/2}]$$

The range of numerical values for the polar solvent was determined by Examples and Comparative Examples (described later).

In the Hansen solubility parameters, solubility parameters introduced by Hildebrand are divided into three components, i.e. a dispersion term δd, a polarity term δp, and a hydrogen bond term δh, and expressed in a three-dimensional space. The dispersion term δd shows the effect of non-polar interaction. The polarity term δp shows the effect of inter-dipole force. The hydrogen bond term δh shows the effect of hydrogen bond strength. In practical application, a two-dimensional map of the polarity term δp and the hydrogen bond term δh is used. The values of the Hansen solubility parameters have been examined for many solvents and resins, and stated, for example, in Wesley L. Archer, "Industrial Solvents Handbook". Regarding mixtures of solvents, the Hansen solubility parameters can be calculated in terms of average solubility parameters according to the mixing ratio.

On a parameter map in which the polarity term δp is plotted along the abscissa axis, and the hydrogen bond term δh along the ordinate axis, polystyrene is at the position of δp=5.8 and δh=4.3 (see FIG. 1). Polar solvents falling within a circle centered at this position and having a radius of 7.1 exhibit solubility with respect to polystyrene. Meanwhile, publicly-known, easily-volatile hydrocarbons generally used as blowing agents for polystyrene resins are located at positions near the origin (δp=δh=0) on the parameter map.

Accordingly, solvents located at short distances from the origin defined by the Hansen solubility parameters can be said to exhibit a high mutual solubility with blowing agents (in general, easily-volatile hydrocarbons). When a compacted material formed by mixing together a polystyrene resin and a volume reducing agent is dipped in a blowing agent, the volume reducing agent in the compacted material diffuses into the blowing agent until an equilibrium is reached, and the blowing agent penetrates into the compacted material. The expandable polystyrene resin regeneration treatment according to the present invention is characterized in that the volume reducing agent in the compacted material is diffused into the blowing agent until the volume reducing agent in the compacted material and the blowing agent reach an equilibrium at ordinary room temperature.

That is, the regeneration treatment is characterized by allowing the blowing agent to penetrate into the compacted material, which is a mixture of the volume reducing agent and the polystyrene resin swollen with the volume reducing agent, at ordinary room temperature.

Therefore, the expandable polystyrene resin regeneration treatment according to the present invention also features minimum energy loss and hence allows blowing agent penetration equipment to be minimized in scale. When a polar solvent exhibiting a high mutual solubility with the blowing agent is used as a volume reducing agent, the rate at which the volume reducing agent in the compacted material diffuses into the blowing agent is high. Consequently, the compacted material loses the volume reducing agent rapidly to become a solid resin. In other words, the penetration of the blowing agent is retarded, so that an extremely long time is required for the expandable polystyrene resin regeneration treatment performed at ordinary room temperature. From the practical point of view, the expandable polystyrene resin regeneration should preferably be carried out in such a way that the volume reducing agent in the compacted material gradually diffuses into the blowing agent in a short period of time, and the blowing agent is allowed to penetrate into the resin swollen with the volume reducing agent by dipping.

The term "volume reducing agent" as used in the present invention means as follows. On a Hansen solubility parameter map in which the polarity term $\delta p$ is plotted along the abscissa axis, and the hydrogen bond term $\delta h$ along the ordinate axis, polystyrene is at the position of $\delta p=5.8$ and $\delta h=4.3$ (see FIG. 1). Polar solvents falling within a circle centered at this position and having a radius of 7.1 exhibit solubility with respect to polystyrene (i.e. within the region A in FIG. 1). Specific examples of polar solvents satisfying these conditions and hence usable as the volume reducing agent in the present invention are ketones, esters, polyhydric alcohol ether acetates, ethers, halogenated hydrocarbons, nitro compounds, and amines. At least one selected from the group consisting of such solvents in which a polystyrene resin is readily soluble is usable as a volume reducing agent, either alone or as a mixture.

However, aliphatic hydrocarbons, e.g. paraffin, olefin and acetylenic hydrocarbons, and aromatic compounds that are carbocyclic compounds having a benzene nucleus, e.g. benzene, toluene, and xylene, cannot be used alone (singly) as a volume reducing agent in the present invention. Such aliphatic hydrocarbons and aromatic compounds are at short distances from the origin defined by the Hansen solubility parameters and hence exhibit a high mutual solubility with the blowing agent (easily-volatile hydrocarbon). Accordingly, if any of these compounds having a high mutual solubility is used as a volume reducing agent, the volume reducing agent in the compacted material diffuses into the blowing agent at a high rate. Consequently, the compacted material loses the volume reducing agent rapidly to become a solid polystyrene resin.

Therefore, solvents that are within 6.8 from the origin on the Hansen solubility parameter map are excluded from the group of solvents usable as the volume reducing agent in the present invention (i.e. those within the region B in FIG. 1). Further, alcohols and polyhydric alcohols fall within the region C on the Hansen solubility parameter map (see FIG. 1) and cannot be used alone as a volume reducing agent. Thus, solvents falling within the region A on the Hansen solubility parameter map are usable alone in the present invention. If a mixed solvent is used, solvents falling within the regions A, B and C on the Hansen solubility parameter map should be mixed together as follows. Solvents falling within the regions A and B, respectively, are mixed together to prepare a mixed solvent. Solvents falling within the regions A and C, respectively, are mixed together to prepare a mixed solvent. Solvents falling within the regions B and C, respectively, are mixed together to prepare a composition serving as a solvent falling within the region A.

Regarding volume reducing agents comprising compositions prepared by mixing together solvents as stated above, polar solvents falling within the above-described circle having a radius of 7.1 exhibit solubility with respect to polystyrene (i.e. within the region A in FIG. 1). More specifically, the following solvents are used either alone or as a mixture of two or more:

Nitrobenzene, o-dichlorobenzene, acetophenone, 1,2-dichloroethane, tetrachloroethylene, 1,1-dichloroethylene, 1,1-dicholoroethane, quinoline, pyridine, ethyl cinnamate, methylene chloride, 1,4-dioxane, aniline, morpholine, N-methylmorpholine, N-ethylmorpholine, cyclohexanone, 1,1,2,2-tetrachloroethane, diethyl carbonate, dimethyl phthalate, diethyl phthalate, dibutyl phthalate, dioctyl phthalate, anisole, benzonitrile, 1-nitropropane, propylene glycol phenyl ether, propylene glycol hexyl ether, dipropylene glycol butyl ether, dipropylene glycol hexyl ether, triethylene glycol dimethyl ether, triethylene glycol ethyl ether, triethylene glycol butyl ether, triethylene glycol propyl ether, ethylene glycol hexyl ether, diethylene glycol dimethyl ether, diethylene glycol butyl ether, butylene glycol butyl ether, cyclohexylamine, ethylene glycol ethyl ether acetate, ethylene glycol butyl ether acetate, propylene glycol methyl ether acetate, diethylene glycol butyl ether acetate, dipropylene glycol methyl ether acetate, tetrahydrofuran, dimethyl succinate, dimethyl glutarate, dimethyl adipate, diethyl succinate, isophorone, methyl acetate, ethyl acetate, propyl acetate, isopropyl acetate, butyl acetate, isobutyl acetate, amyl acetate, methyl isoamyl ketone, methyl ethyl ketone, diethyl ketone, methyl propyl ketone, methyl isobutyl ketone, and methyl hexyl ketone.

The compacted waste expanded polystyrene resin has been swollen by the dissolving action of the volume reducing agent. The compacted material is dipped in the blowing agent. The volume reducing agent in the compacted material is extracted into the blowing agent. In other words, the volume reducing agent in the compacted material diffuses into the blowing agent until an equilibrium is reached, and the blowing agent penetrates into the compacted material.

Accordingly, the polystyrene resin can be impregnated with the blowing agent at the same time as the volume reducing agent is extracted from the compacted material. The term "blowing agent" as used in the present invention means an easily-volatile hydrocarbon. Butane, pentane, hexane, etc. and isomers thereof may be used either alone or as a mixture of two or more. However, when butane, which is gas under ordinary temperature and pressure conditions, is used as a blowing agent, it needs to be handled in a liquid state under a pressure not lower than 0.11 MPa (gauge pressure) when the treatment temperature is 20° C. Therefore, a simple pressure vessel of 0.5 MPa (gauge pressure) or below is used.

After the compacted material has been dipped in or kneaded with the blowing agent, it is allowed to stand, thereby separating the solid matter from the mixed liquid consisting essentially of the volume reducing agent and the blowing agent. The remaining mixed liquid is separated by a distillation operation to recover the volume reducing agent and the blowing agent for reuse. The compacted material prepared by the above-described method is a viscous substance comprising the polystyrene resin swollen and dissolved in the volume reducing agent. It is necessary to obtain, from this substance, regenerated expandable polystyrene resin particles with a diameter of 0.5 to 1.5 mm generally used in the expanded bead foaming process. Because the compacted material is a viscous substance, it is necessary to form regenerated expandable polystyrene resin particles with the above-described particle diameter while preventing the polystyrene resin particles from adhering (fusing) together.

One method available for this purpose is as follows. The compacted material is extruded in the form of a string at room temperature, and this is held on a non-adhesive substrate of polyethylene, fluorocarbon resin, or the like. The string-shaped, compacted material held on the substrate is dipped in the above-described blowing agent at a temperature at least 20° C. lower than the softening temperature of the polystyrene resin, preferably at a mild temperature of 10 to 40° C., thereby performing the extraction of the volume reducing agent and the impregnation with the blowing agent. Thereafter, the string-shaped, compacted material is cut into particles with a desired shape.

(Second Method of Producing Regenerated Expandable Polystyrene Resin Particles)

A second method of producing regenerated expandable polystyrene resin particles according to the present invention is characterized in that a waste foamed polystyrene resin material made of an expanded polystyrene resin is dissolved in a volume reducing agent having solubility with respect to the foamed polystyrene resin material and exhibiting a mutual solubility with a blowing agent to be used, thereby forming a compacted material, and the compacted material and an extraction solvent for extracting the volume reducing agent are dispersed and kneaded with each other to extract the volume reducing agent, thereby forming a solid material. Then, the solid material is formed into a particulate material consisting of particles and dipped in the blowing agent for expanding the polystyrene resin at ordinary room temperature, and, at the same time, the volume reducing agent is further extracted to regenerate the expanded polystyrene resin.

The second method of producing regenerated expandable polystyrene resin particles according to the present invention is substantially the same as the above up to the step of dissolving a waste expanded polystyrene resin in a volume reducing agent to form a compacted material. The compacted material, which is a viscous substance, and an extraction solvent are kneaded together in a stirring machine to mix together the extraction solvent and the compacted material uniformly. As the result of kneading together the compacted material and the extraction solvent, the volume reducing agent in the compacted material diffuses into the extraction solvent phase. Thus, the volume reducing agent in the compacted material is extracted. In other words, the volume reducing agent in the expanded polystyrene resin is extracted to reduce the content of the volume reducing agent.

The process of kneading together the compacted material and the extraction solvent is carried out as a pretreatment for impregnation of the blowing agent into the compacted material. The compacted material is stirred, together with the extraction solvent, in a homogenizer or the like to effect dispersion. Alternatively, the compacted material and the extraction solvent are kneaded together at room temperature by using a mixer or the like. Thereafter, the mixture is allowed to stand, and the compacted material is taken out. Accordingly, it is possible to perform a treatment for minimizing the content of the volume reducing agent and for reducing the adhesion of the compacted material due to the viscosity thereof.

As the extraction solvent used in the pretreatment, it is possible to use one selected from easily-volatile hydrocarbons usable as blowing agents, and alcohols and polyhydric alcohols exhibiting a low solubility with respect to the polystyrene resin. The compacted material thus obtained, which is a solid material, is extruded at room temperature by using an extruder and cut into particles.

In the second method of the present invention, the shaped compacted material is dipped in the blowing agent at a temperature at least 20° C. lower than the softening temperature of the polystyrene resin, preferably at a mild temperature of 10 to 40° C., thereby performing the extraction of the volume reducing agent and the impregnation with the blowing agent in the same way as in the above-described first method of the present invention.

As has been detailed above, an advantage of the present invention is as follows. A compacted material obtained by reducing the volume of a waste foamed polystyrene resin material with a volume reducing agent is dipped in a blowing agent to extract the volume reducing agent and to perform impregnation with the blowing agent, thereby producing regenerated expandable polystyrene resin particles. Therefore, the operation for recovery of the volume reducing agent and the operation of impregnating the blowing agent into the resin can be performed in a single process step.

Accordingly, it is possible to simplify the process in comparison to the conventional post-impregnation method and to save heat energy. Another advantage of the present invention is as follows. It is unnecessary to carry out heating at a temperature not lower than the melting temperature of the resin during the process. Accordingly, deterioration of the regenerated resin due to heat history is minimized. Moreover, the blowing agent used to extract the volume reducing agent can be separated by a distillation operation to recover the volume reducing agent and the blowing agent for reuse. Accordingly, the method of the present invention is free from environmental pollution.

BEST MODE FOR CARRYING OUT THE INVENTION (Embodiment 1)

Figure 1:
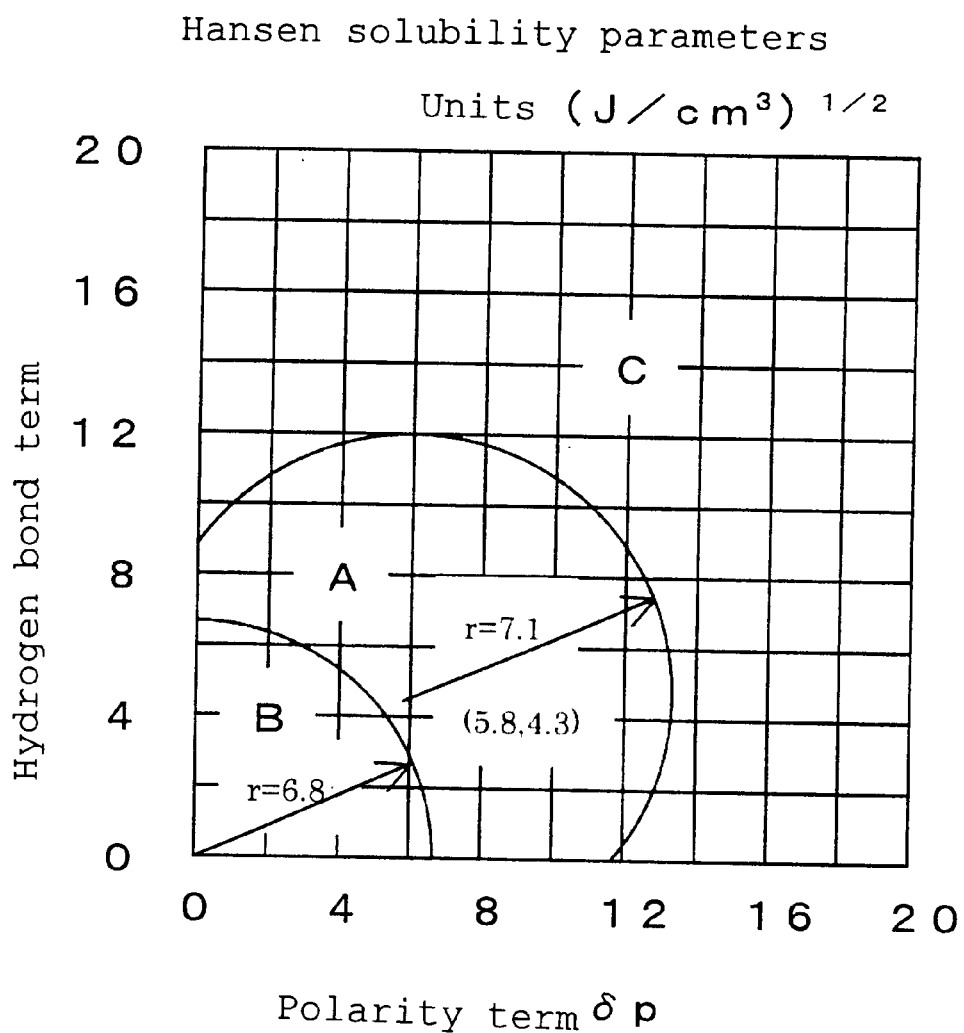
FIG. 1 is a Hansen solubility parameter map in which the polarity term $\delta p$ is plotted along the abscissa axis, and the hydrogen bond term $\delta h$ along the ordinate axis.
Figure 2:
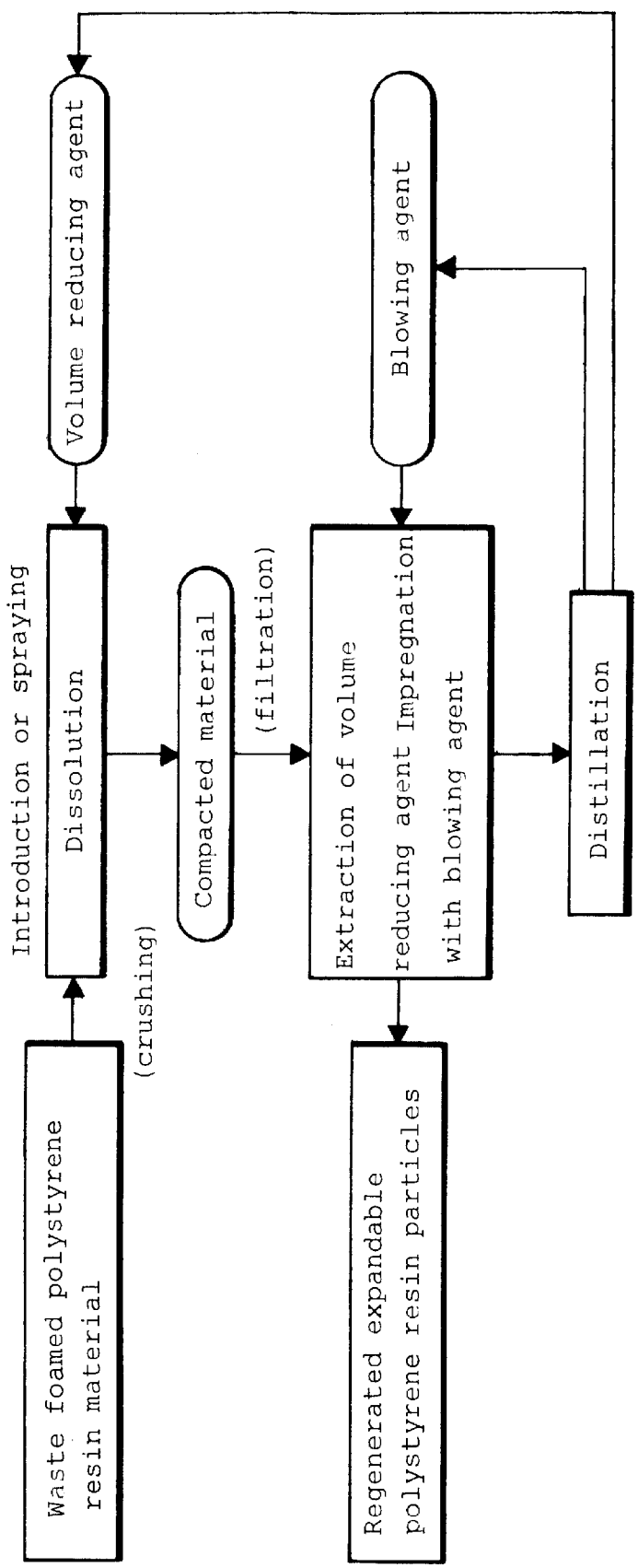
FIG. 2 is a diagram schematically showing an embodiment 1 of the method of producing regenerated expandable polystyrene resin particles according to the present invention.

FIG. 2 is a diagram schematically showing an embodiment 1 of the method of producing regenerated expandable polystyrene resin particles according to the present invention. A waste foamed polystyrene resin material is crushed, if necessary, and sprayed with or introduced into a volume reducing agent, thereby dissolving 100 parts (phr, parts by weight) of the waste foamed polystyrene resin material in 100 to 200 parts of the volume reducing agent. Foreign substances, such as metal pieces, in the compacted material dissolved in the volume reducing agent are removed by a method, e.g. filtration, or magnetic adhesion using magnets. Next, the compacted material is shaped into a string-like form by a forming machine, e.g. a plunger extruder or a screw extruder, at room temperature.

Prior to the shaping process, the viscosity of the compacted material is adjusted according to need. It is preferable that the volume reducing agent content should be adjusted to be 10 to 150 parts (parts by weight) with respect to 100 parts of the foamed polystyrene resin material by extracting the volume reducing agent or adding the foamed polystyrene resin material or the volume reducing agent.

Because it is a viscous string-shaped substance, the shaped compacted material is held by being wound around a non-adhesive plate- or bar-shaped substrate of polyethylene, fluorocarbon resin, etc. The string-shaped, compacted material held on the substrate is dipped in an easily-volatile hydrocarbon blowing agent, e.g. butane, pentane, or hexane, which is used as a blowing agent, thereby performing an extraction and impregnation treatment. The dipping of the compacted material in the blowing agent is carried out at ordinary room temperature. However, when butane, which is gas under ordinary temperature and pressure conditions, is used as a blowing agent, it needs to be handled in a liquid state under a pressure not lower than 0.11 MPa (gauge pressure) when the treatment temperature is 20° C. Therefore, a simple pressure vessel of 0.5 MPa (gauge pressure) or below is used.

The mixed liquid after the dipping treatment is separated to recover the volume reducing agent and the blowing agent for reuse by distillation using the difference in boiling point between them or by gas-liquid separation. In gas-liquid separation, the mixed liquid is introduced into a flash drum kept at a lower pressure than the dipping pressure to vaporize only the blowing agent, thereby separating and recovering the volume reducing agent from the mixture. The vaporized blowing agent is recondensed by cooling under pressure for reuse. The operation of separating and recovering the volume reducing agent and the blowing agent may be carried out as a treatment of the mixed liquid after the dipping treatment. Alternatively, the separating and recovering operation may be performed continuously during the dipping treatment to renew the blowing agent. Therefore, the volume reducing agent and the blowing agent can be recycled without being released into the environment.

After being dipped for a predetermined period of time, the string-shaped, compacted material is cut by a cutting machine, e.g. a strand cutter, to obtain regenerated expandable polystyrene resin particles. It is preferable that the blowing agent content should be 6 to 10 parts (parts by weight) with respect to 100 parts of the polystyrene resin.

(Embodiment 2)

A waste foamed polystyrene resin material is crushed, if necessary, and sprayed with or introduced into a volume reducing agent, thereby dissolving the waste foamed polystyrene resin material in the volume reducing agent to form a compacted material. Up to this step, the embodiment 2 is the same as the embodiment 1. The embodiment 2 is distinguished by having the step of dispersing and kneading together the compacted material and an extraction solvent for extracting the volume reducing agent as a step subsequent to the above-described step.

As the extraction solvent, it is possible to use one selected from easily-volatile hydrocarbons usable as blowing agents, and alcohols and polyhydric alcohols exhibiting a low solubility with respect to the polystyrene resin. Thus, the compacted material is reduced in the volume reducing agent content to form a solid material. The solid material is formed into a particulate material consisting of particles with a diameter of 0.5 to 1.5 mm by a forming machine. A preferable volume reducing agent content in the particulate material is 10 to 100 parts (parts by weight) with respect to 100 parts of the polystyrene resin.

The particulate material is dipped in a blowing agent for expanding the polystyrene resin for about 12 to 48 hours at ordinary room temperature, and, at the same time, the volume reducing agent is further extracted to regenerate an expandable polystyrene resin. It is preferable that the blowing agent content should be 6 to 10 parts (parts by weight) with respect to 100 parts of the polystyrene resin. The mixed liquid after the dipping treatment is recovered and reused in the same way as in the embodiment 1. The separating and recovering operation can also be performed to renew the blowing agent during the dipping treatment as in the case of the embodiment 1.

EXAMPLES

The present invention will be described below by way of examples.

Examples 1 to 8 and Comparative Examples 1 to 4

7 g of bead expanded polystyrene with an expansion ratio of 40 was cut into a square column 10 mm×10 mm×50 mm in size. This was introduced into 10 g of each volume reducing agent shown in Table 1 below and dissolved therein at room temperature to form a compacted material. The compacted material was extruded in the form of a string with a diameter of 2 mm by a plunger extruder. The string-shaped compacted material was spirally wound around a low-density polyethylene tube with an outer diameter of 5 mm and dipped in 10 ml of n-hexane.

After 4 hours had elapsed, the string-shaped compacted material was removed from the tube and further dipped in the n-hexane for 16 hours at ordinary room temperature (about 20° C.). Then, the string-shaped compacted material was taken out of the n-hexane and cut into particles that were 1 mm in size. After the expandable resin particles had been allowed to stand for 6 hours, a foaming test was carried out in boiling water for 1 minute. Table 1 shows the properties of the compacted materials and the results of the foaming test performed on the expandable resin particles.

It should be noted that the volume reduction time was measured as follows. A bead expanded polystyrene molded material with an expansion ratio of 50 was cut into a cube 10 by 10 mm square to prepare a specimen. This was introduced into 50 g of each volume reducing agent shown in Table 1 below at a liquid temperature of 20° C., and sunk in the liquid with a glass rod to measure the time required for the specimen to break down and to disperse or dissolve in the volume reducing agent. It was possible to deduce the following numerical values from the analysis of these examples and comparative examples. That is, solvents used in the present invention are those whose hydrogen bond term $\delta h$ and polarity term $\delta p$ of the Hansen solubility parameters satisfy the following conditions:

$(\delta p-5.8)^2+(\delta h-4.3)^2<50$ and $\delta p^2+\delta h^2>46$ [units:$(J/cm^3)^{1/2}$]

Solvents satisfying the above conditions in the present invention were determined as follows.

The value "46" was deduced from the experimental results regarding dipropylene glycol monomethyl ether acetate (abbreviated as "DPMA") in Example 7. Regarding DPMA, $\delta p^2+\delta h^2=46.6$. This is the smallest $(\delta p^2+\delta h^2)$ value of those of solvents usable as a volume reducing agent in examples of the present invention. From the experimental results, the condition of $\delta p^2+\delta h^2>46$ was set in the present invention. That is, ordinary bead expanded polystyrene foams are products with an expansion ratio of 5 to 100, and the expansion ratio of DPMA is 5. Therefore, this is defined as a region A.

Another condition, i.e. $(\delta p-5.8)^2+(\delta h-4.3)^2<50$, was set as follows. Among solvents providing good volume reduction conditions, limonene in Comparative Example 2 exhibited the largest $[(\delta p-5.8)^2+(\delta h-4.3)^2]$ value (45.5). Among solvents inferior in volume reduction performance, dipropylene glycol monomethyl ether (abbreviated as "DPM") in Comparative Example 4 exhibited the smallest $[(\delta p-4.3)^2+(\delta h-2.1)^2]$ value (55.1). An intermediate value between the two values was defined as a boundary value "50".

Example 9

To a compacted material prepared in the same way as in Example 8, n-hexane was added in an amount half of the amount of the compacted material. The mixture was kneaded for 1 minute at room temperature (about 20° C.) in a mixer. The same operation was repeated twice with the liquid portion renewed. The compacted material changed from being transparent to white and semitransparent, and its adhesion reduced. The compacted material was extruded in the form of a string by a plunger extruder and cut into particles with a diameter of 1 mm by a strand cutter. Thereafter, the particulate material was dipped in n-pentane. The dipping treatment was performed for 20 hours at room temperature. Then, a foaming test was carried out. As a result, substantially spherical expandable resin particles with an expansion ratio of 49 were obtained.

TABLE 1

| Classification | Volume reducing agents (solubility parameters $\delta p, \delta h$) | Volume reduction condition | Volume reduction time | Appearance of compacted material | Expansion ratio |
| --- | --- | --- | --- | --- | --- |
| Ex. 1 | acetone (10.4, 7.0) | good | 2 sec. | transparent two layers | 7 |
| Ex. 2 | tetrahydrofuran (5.7, 8.0) | good | 8 sec. | transparent uniform | 7 |
| Ex. 3 | ethyl acetate (5.3, 7.2) | good | 5 sec. | transparent uniform | 12 |
| Ex. 4 | propylene glycol monomethyl ether acetate (6.1, 6.6) | good | 14 sec. | transparent uniform | 17 |
| Ex. 5 | ethylene glycol monoethyl ether acetate (4.7, 10.6) | good | 11 sec. | transparent uniform | 18 |
| Ex. 6 | ethylene glycol mono-n-butyl ether acetate (6.1, 10.0) | good | 17 sec. | transparent uniform | 16 |
| Ex. 7 | dipropylene glycol monomethyl ether acetate (5.3, 4.3) | good | 70 sec. | transparent uniform | 5 |
| Ex. 8 | adipic, glutaric and succinic acid dimethyl ester composition (4.7, 9.8) | good | 50 sec. | transparent uniform | 47 |
| Comp. Ex. 1 | xylene (1.8, 2.5) | good | 8 sec. | transparent uniform | 1.4 |
| Comp. Ex. 2 | limonene (0.6, 0.0) | good | 30 sec. | transparent uniform | 1.0 |
| Comp. Ex. 3 | tripropylene glycol methyl ether (3.5, 11.5) | slow | more than 40 min. | white two layers | 1.3 |
| Comp. Ex. 4 | dipropylene glycol monomethyl ether (4.0, 11.5) | slow | more than 25 min. | white two layers | 3 |

INDUSTRIAL APPLICABILITY

Regenerated expandable polystyrene resin particles produced by the present invention are usable as a high-quality material for foaming container packaging materials, e.g. packing materials and cushioning materials, and so forth.

What is claimed is:

1. A method of producing regenerated expandable polystyrene resin particles, comprising the steps of:
    dissolving a waste foamed polystyrene resin material made of an expanded polystyrene resin in a volume reducing agent having solubility with respect to said foamed polystyrene resin material and exhibiting a mutual solubility with a blowing agent to be used, thereby forming a compacted material;
    dipping said compacted material in said blowing agent for expanding said polystyrene resin at ordinary room temperature, thereby extracting said volume reducing agent from said compacted material and, at the same time, impregnating said compacted material with said blowing agent to regenerate said expanded polystyrene resin; and
    forming said expanded polystyrene resin regenerated into a predetermined shape.

2. A method of producing regenerated expandable polystyrene resin particles, comprising the steps of:
    dissolving a waste foamed polystyrene resin material made of an expanded polystyrene resin in a volume reducing agent having solubility with respect to said foamed polystyrene resin material and exhibiting a mutual solubility with a blowing agent to be used, thereby forming a compacted material;
    dispersing and kneading together said compacted material and an extraction solvent for extracting said volume reducing agent to extract said volume reducing agent, thereby forming a solid material;
    forming said solid material into a particulate material consisting of particles; and
    dipping said particulate material in the blowing agent for expanding said polystyrene resin at ordinary room temperature, and, at the same time, further extracting said volume reducing agent to regenerate said expanded polystyrene resin.

3. A method of producing regenerated expandable polystyrene resin particles according to claim 1 or 2, wherein said compacted material is dipped in said blowing agent at a temperature at least 20° C. lower than a softening temperature of said polystyrene resin, thereby performing extraction of said volume reducing agent and impregnation with said blowing agent.

4. A method of producing regenerated expandable polystyrene resin particles according to claim 3, wherein said blowing agent is at a temperature of 10 to 40° C.

5. A method of producing regenerated expandable polystyrene resin particles according to one selected from claims 1 or 2, wherein said volume reducing agent is a polar solvent having solubility with respect to said polystyrene resin and exhibiting a mutual solubility with said blowing agent, said polar solvent being one whose hydrogen bond term δh and polarity term δof Hansen solubility parameters satisfy the following conditions:

$$(\delta p-5.8)^2+(\delta h-4.3)^2<50 \text{ and } \delta p^2+\delta h^2>46 \quad [\text{units}:(\text{J}/\text{cm}^3)^{1/2}]$$

6. A method of producing regenerated expandable polystyrene resin particles according to claim 5, wherein the solvent used as said volume reducing agent is at least one solvent selected from the group consisting of ketones, esters, polyhydric alcohol ether acetates, ethers, halogenated hydrocarbons, nitro compounds, and amines.

7. A method of producing regenerated expandable polystyrene resin particles according to claim 5, wherein the solvent used as said volume reducing agent is a mixed solvent consisting essentially of at least one solvent selected from the group consisting of aliphatic hydrocarbons and aromatic hydrocarbons, and at least one solvent selected from the group consisting of ketones, esters, polyhydric alcohol ether acetates, ethers, halogenated hydrocarbons, nitro compounds, and amines.

8. A method of producing regenerated expandable polystyrene resin particles according to claim 5, wherein the solvent used as said volume reducing agent is a mixed solvent consisting essentially of at least one solvent selected from the group consisting of aliphatic hydrocarbons and aromatic hydrocarbons, and at least one solvent selected from the group consisting of alcohols and polyhydric alcohols.

9. A method of producing regenerated expandable polystyrene resin particles according to claim 5, wherein the solvent used as said volume reducing agent is a mixed solvent consisting essentially of at least one solvent selected from the group consisting of ketones, esters, polyhydric alcohol ether acetates, ethers, halogenated hydrocarbons, nitro compounds, and amines, and at least one solvent selected from the group consisting of alcohols and polyhydric alcohols.

10. A method of producing regenerated expandable polystyrene resin particles according to claim 5, wherein said volume reducing agent is at least one selected from the group consisting of nitrobenzene, o-dichlorobenzene, acetophenone, 1,2-dichloroethane, tetrachloroethylene, 1,1-dichloroethylene, 1,1-dicholoroethane, quinoline, pyridine, ethyl cinnamate, methylene chloride, 1,4-dioxane, aniline, morpholine, N-methylmorpholine, N-ethylmorpholine, cyclohexanone, 1,1,2,2-tetrachloroethane, diethyl carbonate, dimethyl phthalate, diethyl phthalate, dibutyl phthalate, dioctyl phthalate, anisole, benzonitrile, 1-nitropropane, propylene glycol phenyl ether, propylene glycol hexyl ether, dipropylene glycol butyl ether, dipropylene glycol hexyl ether, triethylene glycol dimethyl ether, triethylene glycol ethyl ether, triethylene glycol butyl ether, triethylene glycol propyl ether, ethylene glycol hexyl ether, diethylene glycol dimethyl ether, diethylene glycol butyl ether, butylene glycol butyl ether, cyclohexylamine, ethylene glycol ethyl ether acetate, ethylene glycol butyl ether acetate, propylene glycol methyl ether acetate, diethylene glycol butyl ether acetate, dipropylene glycol methyl ether acetate, tetrahydrofuran, dimethyl succinate, dimethyl glutarate, dimethyl adipate, diethyl succinate, isophorone, methyl acetate, ethyl acetate, propyl acetate, isopropyl acetate, butyl acetate, isobutyl acetate, amyl acetate, acetone, methyl isoamyl ketone, methyl ethyl ketone, diethyl ketone, methyl propyl ketone, methyl isobutyl ketone, and methyl hexyl ketone.

11. A method of producing regenerated expandable polystyrene resin particles, comprising the steps of:

dissolving a waste foamed material made of an expanded polystyrene resin in a volume reducing agent having solubility with respect to said foamed polystyrene resin material and exhibiting a mutual solubility with a blowing agent to be used, thereby forming a compacted material;

extruding said compacted material in a string-like form at room temperature;

holding said compacted material extruded in said string-like form on a non-adhesive substrate for preventing adhesion of said compacted material; and dipping said compacted material held on said substrate in said blowing agent at a temperature at least 20° C. lower than a softening temperature of said polystyrene resin, thereby performing extraction of said volume reducing agent and impregnation with said blowing agent.

12. A method of producing regenerated expandable polystyrene resin particles, comprising the steps of:

dissolving a waste foamed material made of an expanded polystyrene resin in a volume reducing agent having solubility with respect to said foamed polystyrene resin material and exhibiting a mutual solubility with a later-mentioned blowing agent to form a compacted material;

dispersing and kneading together said compacted material and an extraction solvent under stirring, thereby forming a solid material having reduced adhesion;

forming said solid material into a particulate material at room temperature; and dipping said particulate material in said blowing agent at a temperature at least 20° C. lower than a softening temperature of said polystyrene resin, thereby performing extraction of said volume reducing agent and impregnation with said blowing agent.

13. A method of producing regenerated expandable polystyrene resin particles according to claim 11 or 12, wherein said blowing agent is at a temperature of 10 to 40° C.

* * * * *